United States Patent [19]

Gaboury

[11] Patent Number: 4,827,119
[45] Date of Patent: May 2, 1989

[54] ILLUMINANT DISCRIMINATOR

[75] Inventor: Michael J. Gaboury, Spencerport, N.Y.

[73] Assignee: Eastman Kodak Company, Rochester, N.Y.

[21] Appl. No.: 149,322

[22] Filed: Jan. 28, 1988

[51] Int. Cl.$^4$ .............................................. G01R 23/16
[52] U.S. Cl. .......................... 250/214 R; 250/214 A; 324/77 B; 364/485
[58] Field of Search ............... 250/214 R, 214 A, 226, 250/214 L; 324/77 R, 77 B; 356/218, 226; 364/484, 485

[56] References Cited

U.S. PATENT DOCUMENTS

| 4,220,412 | 9/1980 | Shroyer et al. | 250/226 |
| 4,296,374 | 10/1981 | Henry | 324/77 B |
| 4,301,404 | 11/1981 | Ley | 324/77 B |
| 4,686,457 | 11/1987 | Banno | 324/77 B |

Primary Examiner—Edward P. Westin
Attorney, Agent, or Firm—Edward Dugas

[57] ABSTRACT

The present invention is an apparatus for discriminating among various types of illuminants such as fluorescent light, tungsten light and natural daylight. The apparatus is comprised of an analog portion and a digital portion. The analog portion functions to convert incident light into a conditioned analog signal. The digital portion utilizes an analog-to-digital converter and a microprocessor to perform a Fourier series analysis on one or more of the harmonics of the illuminant signal. The microprocessor compares the amplitudes of the harmonics against the amplitudes of known illuminant sources to identify the source.

7 Claims, 2 Drawing Sheets

ILLUMINANT DISCRIMINATOR

BACKGROUND OF THE INVENTION

The present invention relates to an apparatus for discriminating among various types of light sources, such as fluorescent light, incandenscent light and natural daylight.

To produce faithful photographic reproductions of multicolored scenes, the color balance of the photographic film must be compatible with the spectral characteristics of the scene illuminant. Many photographic color emulsions are color balanced for use with natural daylight and others are color balanced for use with incandescent illumination. To properly expose a color film with an illuminant for which the film is not color balanced it is necessary to use color compensating filters.

A patent of interest for its teaching of a method and apparatus for discriminating illuminant light in U.S. Pat. No. 4,220,412 entitled "Illuminant Discrimination Apparatus and Method" by R. A. Shroyer et al. The method and apparatus disclosed in that patent utilizes the temporal signatures of the various light components based upon the harmonical distorted sine wave signal that is derived from the illuminant source impinging on a photodiode. The photodiode produces an electrical signal having an amplitude which varies with the instantaneous intensity of the illuminant. A means is provided for detecting the amount of harmonic distortion in the signal and for indicating the type of illumination impinging on the photodiode as a function of the distortion. In addition, the apparatus is combined with flicker ratio detecting circuitry to provide a system which is capable of discriminating between fluorescent light, incandescent light and natural daylight. The flicker ratio is the ratio of the brightest to the dimmest intensities of the light during a given time interval. Natural light, like other light emanating from a source of constant brightness, has a flicker ratio of unity. Artificial light sources, being energized by ordinary household line voltage, have a brightness which flickers at approximately 120 hertz, twice the frequency of the line voltage. Owing to the different rates at which the energy-responsive elements of incandescent and fluorescent lamps respond to applied energy, such illuminance can be readily distinguished by their respective flicker ratio.

With improvements in the state of the art it is highly desirable to have a system that is heavily digitized for performing the illumination detection. Such systems are readily manufactured incorporating integrated circuits for size and cost reductions. It is highly desirable to keep the use of analog circuits to a minimum as analog circuits are more difficult to implement. In addition, signal processing of the type used with this invention is more quickly accomplished with digital circuitry. In camera applications, the illuminant light source has to be determined almost simultaneously with the pressing of the shutter button in order to provide meaningful aperture adjustment information.

Because illumination takes the form of a periodic wave other methods of deriving signal equivalents are suggested. One patent of interest for its handling of the analysis of periodic waveforms is, U.S. Pat. No. 4,301,404 entitled "Methods and Apparatus for Analyzing Periodic WaveForms" by A. J. Ley. In that patent, a periodic waveform is repetitively sampled at an integer multiple of the frequency of the waveform over a number of cycles and a sum is formed for each sample with the corresponding sample in the previous cycles. A Fourier transformation is applied to the summed samples to derive a measurement of the component corresponding to the summed samples and to the waveform in general.

Another patent of interest for its teaching is, U.S. Pat. No. 4,296,374 entitled "Wide Band Digital Spectrometer" by P. S. Henry. In that patent, the inventor utilizes a Walsh Fourier transformation to perform an analysis of a periodic waveform. The disclosed apparatus performs a wideband digital spectrometry utilizing Walsh functions to achieve a simplified method of producing the Fourier power spectrum of an input signal.

SUMMARY OF THE INVENTION

The present invention provides an apparatus and an associated method which is capable of determining the type of illuminant light that is impinging on the apparatus. The apparatus is comprised of two major portions, an analog portion for conditioning an impinging illuminant signal so that it can be readily converted into a digital signal by an analog-to-digital converter and a second portion which incorporates an analog-to-digital converter and a means for processing the digital signal by performing a Fourier series analysis on the digital signal.

The analog portion of the apparatus is comprised of, a photodiode sensor for transforming the impinging illuminant signal into an AC electrical signal, a transimpedance amplifier, a logarithmic amplifier for processing the AC signal, and a DC blocking shifting stage for providing a level shifted AC signal which is a function of the received illuminant signal.

The digital portion of the apparatus is comprised of an analog-to-digital converter that is coupled to a microprocessor. The microprocessor performs the Fourier series analysis on the converted AC signal by determining, for one or more harmonics of the illuminant signal, the amplitudes of a multiplicity of the harmonics of the converted AC signal and by comparing the determined amplitudes against the threshold values of known illuminant sources.

From the foregoing it can be seen that it is a primary object of the present invention to provide an improved illuminant discrimination apparatus.

It is a further object of the present invention to provide an apparatus for identifying illumination sources which apparatus is conducive to digital implementation.

These and other objects of the present invention will become more apparent when taken in conjunction with the following description and drawings wherein like characters indicate like parts and which drawings form a part of the present specification.

A BRIEF DESCRIPTION OF THE DRAWINGS

DETAILED DESCRIPTION OF THE PREFERRED EMBODIMENT

Figure 1:
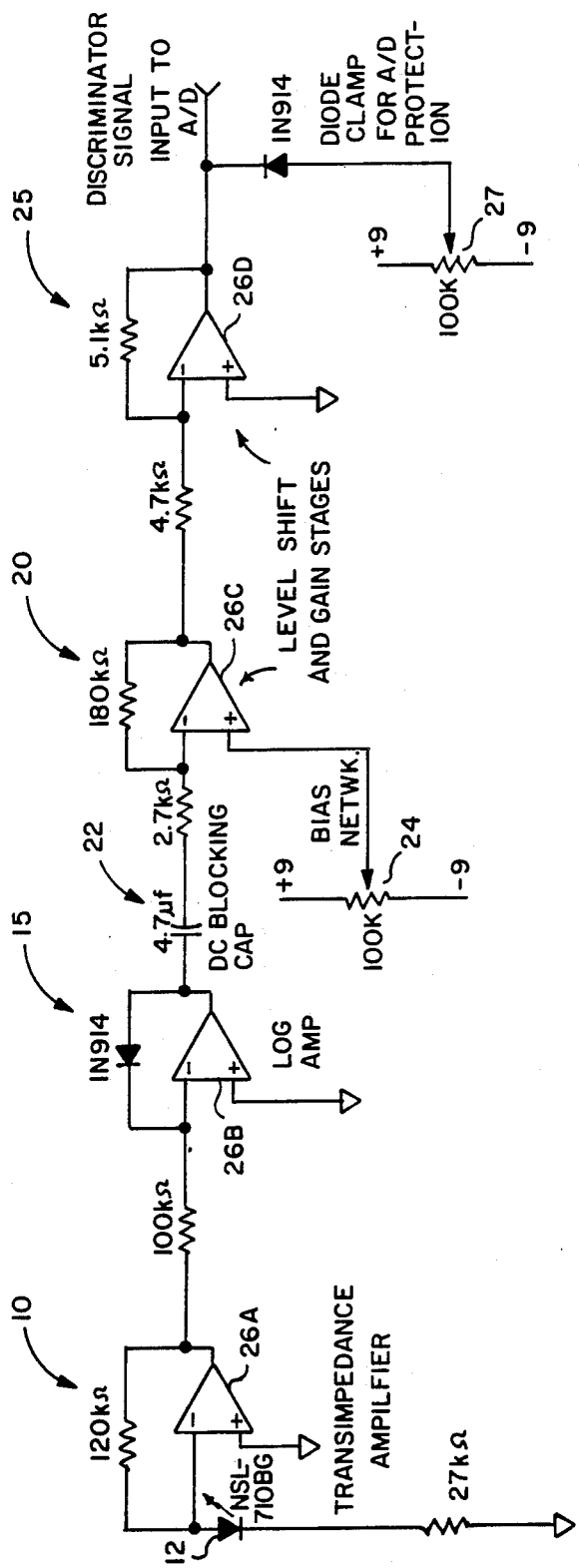
FIG. 1 illustrates, in schematic diagram form, the analog portion of the present invention.

Referring to FIG. 1 a photodiode 12 converts an impinging illuminant light beam into a corresponding electrical signal which is coupled to an input of a differential amplifier 26A. In the preferred embodiment, the photodiode 12 is an NSL-710BG device and the amplifiers 26A-26D are incorporated in a TL084 device both devices being manufactured by National Semiconductor Inc. The illuminant light source may be tungsten, daylight and/or fluorescent light or a combination of these. The discriminator functions to identify which is the dominant source. The photodiode 12 is connected in circuit to form part of a transimpedance amplifier stage 10. The output signal from the amplifier stage 10 is directed to a log amplifier stage 15. The transimpedance amplifier stage is used to amplify the signal from the photodiode and the log amplifier stage is used to compress the range of signals that are passed onto the remainder of the circuitry. The output signal from the log amplifier stage is directed to a level shift and gain stage 20, via a DC blocking capacitor 22. A biasing network 24 comprised of a 100K potentiometer coupled between a +9 V and −9 V source biases the positive input of the differential amplifier 26C so as to provide the proper level shift to the AC signal component present on its negative input. The proper level shift is achieved with approximately +2.5 V on the positive input of amplifier 26C. The output is thus adjusted to range between 0 and +5 V. The level shifted output signal from the amplifier 26C is further amplified by the gain stage 25, which incorporates an amplifier 26D. The output signal from the amplifier 26D is a discriminator signal which is the input to the analog-to-digital, A/D, portion of the present apparatus, shown in FIG. 2. The discriminate signal is clamped to a reference potential by means of a diode clamp IN914 and a voltage divider network 27. The voltage divider network 27 is comprised of a 100K potentiometer coupled between a +9 V and a −9 V source.

The output signal from amplifier 26D is clipped at 0 volts and ranges to +5 V. The voltage divider network 27 is adjusted to provide approximately −0.7 volts to the IN914 diode.

Figure 2:
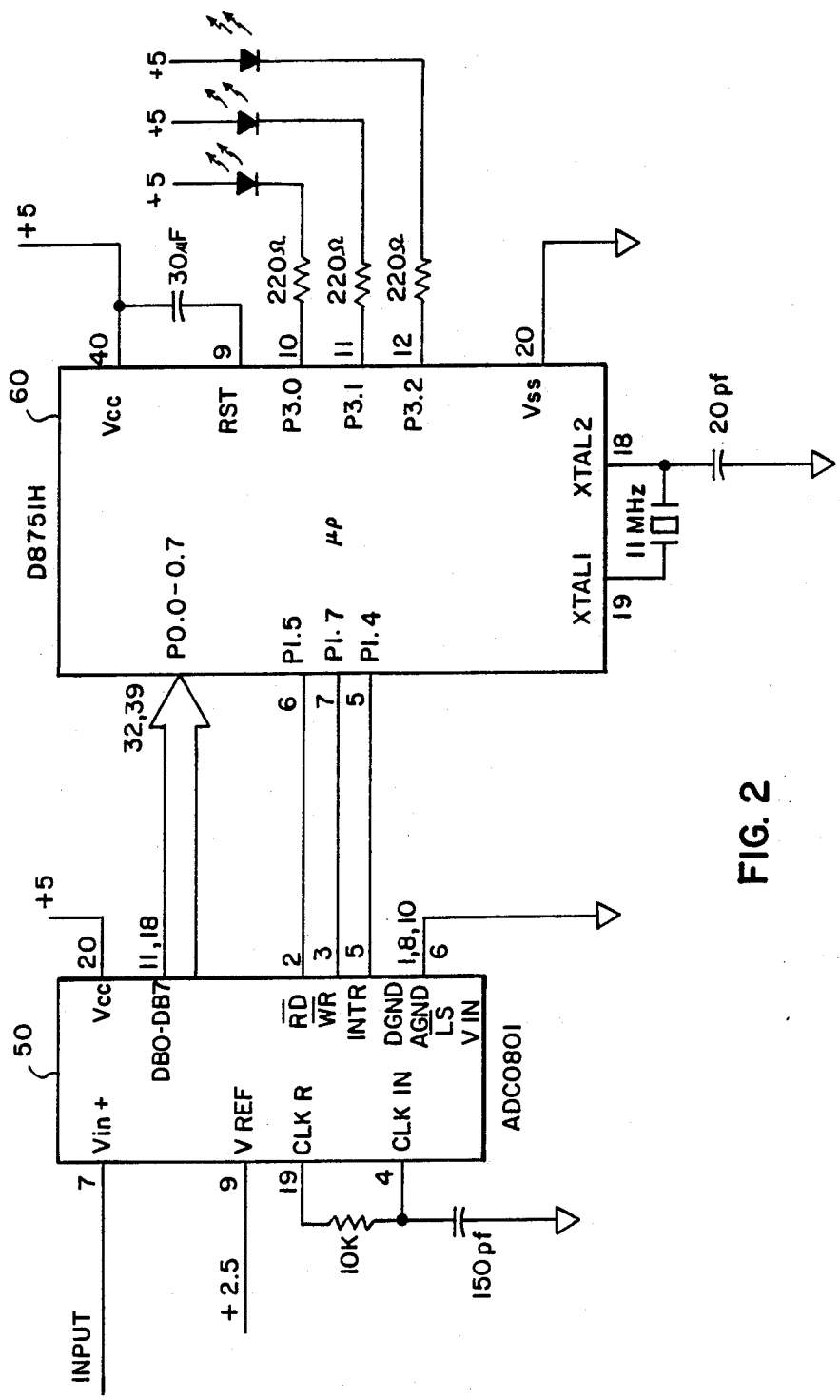
FIG. 2 illustrates, in block diagram form, the digital portion of the present invention.

Referring now to FIG. 2 wherein is shown the digital portion of the present invention. An A/D converter 50 receives on its input, labeled 7, the discriminator signal from the output of the gain stage 25 and operates upon the analog discriminator signal to provide a corresponding 8-bit digital signal on its outputs labeled DB0 to DB7. The A/D converter 50 may be a National Semiconductor device bearing the part number ADC0801. The 8-bit digitized signal is then directed to a microprocessor 60 which may be a microcontroller of the type manufactured by Intel Corporation under their part number D8751H. In the preferred embodiment of the invention the microprocessor 60 analyzes the digital signals appearing on its PD.0 to PD0.7 inputs and provides at three independent outputs, P3.0, P3.1 and P3.2, an indication, via the associated LED devices, as to which one of the three types of illuminating light is dominantly impinging on the photodiode 12 of FIG. 1. If the LED device connected to the output P3.0 is lit, the illuminant source is tungsten. If the LED device connected to the output P3.1 is lit, the illuminant source is daylight and, if the LED connected to the output P3.2 is lit, the illuminant source is fluorescent.

The microprocessor 60 operates upon the fundamental frequency component and one or more harmonical components of the digitized input signal and determines from evenly spaced samples the fundamental frequency and the first harmonic. The amplitudes of each frequency are determined by the square root of the squares of the sine and cosine terms.

The above is derived directly from the following formula:

$$X(k) = \sum_{n=0}^{N-1} x(n)\epsilon^{-j(2\pi/N)nk}$$

where:
k = normalized frequency
n = sample number
N = number of samples/cycle

The fundamental frequency (120 Hz) component and one or more harmonics ae determined from evenly spaced samples of the input waveform. For example, the fundamental frequency and the first harmonic can be determined from 8 samples spaced 1.042 ms apart, assuming 60 Hz line frequency. Strictly speaking, the amplitudes of each frequency are determined by the square root of the squares of the sine and cosine terms. However, since the number is only being compared to a threshold value nonlinear ranging can be used and numbers representing the values can be determined as follows:

(120 Hz component) 2 = (s3−s7) 2 + (s1−s5) 2

(2×240 Hz component) 2 = (s2−s4+s6−s8) 2 + (s1−s3+5−s7) 2 where sn refers to the sample number.

The effective amplification of the second harmonic is unnecessary but the method provides a higher threshold value and a reduction in noise of the weaker amplitude signals. This algorithm is simpler and faster to perform than conventional digital signal processing.

After determining the amplitudes of a sufficient number of harmonics, these amplitudes can be compared against the threshold values of a known light source for identification.

The code used in the microprocessor 60 to perform the analysis and the comparison is set out in the attached Appendix A.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as may fall within the true scope of the invention.

Appendix A

```
MCS-51 MACRO ASSEMBLER    ILMD

ISIS-II MCS-51 MACRO ASSEMBLER V2.1
OBJECT MODULE PLACED IN  :F1:ILMD.OBJ
ASSEMBLER INVOKED BY:  :F2:ASM51  :F1:ILMD.CON DEBUG
```

```
LOC   OBJ          LINE   SOURCE

1     ;       ILLUMINANT DISCRIMINATOR SIGNAL PROCESSING SOFTWARE
                    2     ;                       6/24/87
                    3     ;                       MJGABOURY
                    4     ;
                    5     ;       REGISTER USAGE:
                    6     ;               REGISTER BANK 0:
                    7     ;                       R0- 120HZ SINE COMPONENT
                    8     ;                       R1- 120HZ COSINE COMPONENT
                    9     ;                       R2- 240HZ SINE COMPONENT
                   10     ;                       R3- 240HZ COSINE COMPONENT
                   11     ;                       R4- POS-NEG FLAG FOR REGISTER 2 (#0FFH=NEG)
                   12     ;                       R5- POS-NEG FLAG FOR REGISTER 3    "
                   13     ;                       R6- TEMPORARY STORAGE
                   14     ;                       R7- COUNTER AND TEMP STORAGE
                   15     ;
                   16     ;               FINAL SUMS STORED IN R0-R3
                   17     ;
                   18     ;       PORT USAGE:
                   19     ;               PORT 0:
                   20     ;                       P0.0 A/D INPUT LSB
                   21     ;                       P0.1   "
                   22     ;                       P0.2   "
                   23     ;                       P0.3   "
                   24     ;                       P0.4   "
                   25     ;                       P0.5   "
                   26     ;                       P0.6   "
                   27     ;                       P0.7   "     MSB
                   28     ;               PORT 1:
                   29     ;                       P1.4 READ LINE
                   30     ;                       P1.5 WRITE LINE
                   31     ;                       P1.6 CONVERSION COMPLETE LINE
                   32     ;               PORT 3:
                   33     ;                       P3.0 TUNGSTEN OUTPUT
                   34     ;                       P3.1 DAYLIGHT OUTPUT
                   35     ;                       P3.2 FLUORESCENT OUTPUT
                   36     ;
0033               37     FL1     BIT     33H             ;DEFINE USER FLAG
                   38     ;
                   39     ;
                   40     ;
0000               41             ORG     00H
                   42     ;
                   43     ;       INITIALIZATION ROUTINE
                   44     ;
0000 C2AF          45     INIT:   CLR     EA
0002 5380FF        46             ANL     P0,#0FFH
0005 4390FF        47             ORL     P1,#0FFH
0008 5390BF        48             ANL     P1,#0BFH        ;WR GROUNDED MOMENTARILY
000B 00            49             NOP
000C 00            50             NOP

MCS-51 MACRO ASSEMBLER    ILMD

LOC   OBJ          LINE   SOURCE 000D 758901        51             MOV     TMOD,#01H       ;SET UP TIMER 0 FOR 16 BIT MODE
0010 00            52             NOP
0011 00            53             NOP
0012 4390FF        54             ORL     P1,#0FFH
0015 43A0FF        55             ORL     P2,#0FFH
0018 43B0FF        56             ORL     P3,#0FFH
001B 53A800        57             ANL     IE,#00H
001E 539800        58             ANL     SCON,#00H
0021 C203          59             CLR     RS0
0023 C204          60             CLR     RS1
                   61     ;
                   62     ;       MAIN PROGRAM START
                   63     ;
0025 7F00          64     STA:    MOV     R7,#00H
0027 02002D        65             JMP     STRT
002A 308DFD        66     MAIN:   JNB     TF0,MAIN        ;TIME FOR NEXT SAMPLE?
002D 120121        67     STRT:   CALL    TIME
0030 5390BF        68             ANL     P1,#0BFH        ;START CONVERSION
0033 439040        69             ORL     P1,#40H         ;WRITE LINE UP
0036 00            70             NOP                     ;ALLOW CONVERSION TO START
0037 00            71             NOP
0038 00            72             NOP
0039 00            73             NOP
003A 00            74             NOP
003B 00            75             NOP
003C 00            76             NOP
003D 00            77             NOP
003E 00            78             NOP
003F 00            79             NOP
0040 00            80             NOP
0041 00            81             NOP
0042 00            82             NOP
```

```
0043 00                83              NOP
0044 00                84              NOP
0045 2094FD            85      LP1:    JB      P1.4,LP1
0048 5390DF            86              ANL     P1,#0DFH        ;READ ENABLE
004B E580              87      DATN:   MOV     A,P0            ;LOAD DATA FROM A/D
004D C3                88              CLR     C
004E 13                89              RRC     A               ;THROW AWAY DATA
004F 00                90              NOP
0050 00                91              NOP
0051 439020            92              ORL     P1,#020H        ;READ OFF
                       93      ;
                       94      ;
                       95      ; DECISION TREE
                       96      ;
0054 BF0005            97              CJNE    R7,#00H,PTA     ;S0 ROUTINE
0057 F9                98              MOV     R1,A
0058 FB                99              MOV     R3,A
0059 0F               100              INC     R7
005A 012A             101              AJMP    MAIN
                      102      ;
005C BF0104           103      PTA:    CJNE    R7,#01H,PTB     ;S1 ROUTINE
005F FA               104              MOV     R2,A
0060 0F               105              INC     R7
```

MCS-51 MACRO ASSEMBLER    ILMD

LOC   OBJ              LINE    SOURCE

```
0061 012A             106              AJMP    MAIN
                      107      ;
0063 BF0208           108      PTB:    CJNE    R7,#02H,PTC     ;S2 ROUTINE
0066 F8               109              MOV     R0,A
0067 CB               110              XCH     A,R3
0068 C3               111              CLR     C
0069 9B               112              SUBB    A,R3
006A FB               113              MOV     R3,A
006B 0F               114              INC     R7
006C 012A             115              AJMP    MAIN
                      116      ;
006E BF0307           117      PTC:    CJNE    R7,#03H,PTD     ;S3 ROUTINE
0071 CA               118              XCH     A,R2
0072 C3               119              CLR     C
0073 9A               120              SUBB    A,R2
0074 FA               121              MOV     R2,A
0075 0F               122              INC     R7
0076 012A             123              AJMP    MAIN
                      124      ;
0078 BF040F           125      PTD:    CJNE    R7,#04H,PTE     ;S4 ROUTINE
007B CB               126              XCH     A,R3
007C C3               127              CLR     C
007D 3B               128              ADDC    A,R3
007E CB               129              XCH     A,R3            ;PRESERVE ACC
007F C9               130              XCH     A,R1
0080 C3               131              CLR     C
0081 99               132              SUBB    A,R1
0082 5002             133              JNC     A3              ;CHECK FOR NEG NUMBER
0084 F4               134              CPL     A
0085 04               135              INC     A
0086 F9               136      A3:     MOV     R1,A
0087 0F               137              INC     R7
0088 012A             138              AJMP    MAIN
                      139      ;
008A BF0506           140      PTE:    CJNE    R7,#05H,PTF     ;S5 ROUTINE
008D C3               141              CLR     C
008E 3A               142              ADDC    A,R2
008F FA               143              MOV     R2,A
0090 0F               144              INC     R7
0091 012A             145              AJMP    MAIN
                      146      ;
0093 BF0615           147      PTF:    CJNE    R7,#06H,PTG     ;S6 ROUTINE
0096 C8               148              XCH     A,R0            ;PRESERVE ACC
0097 C3               149              CLR     C
0098 98               150              SUBB    A,R0
0099 5002             151              JNC     A4              ;CHECK FOR NEG NUMBER
009B F4               152              CPL     A
009C 04               153              INC     A
009D C8               154      A4:     XCH     A,R0
009E CB               155              XCH     A,R3
009F C3               156              CLR     C
00A0 9B               157              SUBB    A,R3
00A1 5002             158              JNC     A1
00A3 F4               159              CPL     A
00A4 04               160              INC     A
```

MCS-51 MACRO ASSEMBLER    ILMD

| LOC | OBJ | LINE | SOURCE | | | |
|---|---|---|---|---|---|---|
| 00A5 | F8 | 161 | A1: | MOV | R3,A | |
| 00A6 | 0F | 162 | | INC | R7 | |
| 00A7 | 012A | 163 | | AJMP | MAIN | |
| | | 164 | ; | | | |
| | | 165 | ; | | | IF R7 GETS TAMPERED WITH, COME HERE |
| 00A9 | 01A9 | 166 | BERR: | AJMP | BERR | |
| | | 167 | ; | | | |
| | | 168 | ; | | | |
| 00AB | BF07FB | 169 | PTG: | CJNE | R7,#07H,BERR | ;S7 ROUTINE |
| 00AE | CA | 170 | | XCH | A,R2 | |
| 00AF | C3 | 171 | | CLR | C | |
| 00B0 | 9A | 172 | | SUBB | A,R2 | |
| 00B1 | 5002 | 173 | | JNC | A2 | |
| 00B3 | F4 | 174 | | CPL | A | |
| 00B4 | 04 | 175 | | INC | A | |
| 00B5 | FA | 176 | A2: | MOV | R2,A | |
| | | 177 | ; | | | |
| | | 178 | ; | | | |
| | | 179 | ; | | | |
| | | 180 | ; | | SQUARING ROUTINE | |
| | | 181 | ; | | | |
| 00B6 | E8 | 182 | SQR: | MOV | A,R0 | ;SIN 120 |
| 00B7 | 88F0 | 183 | | MOV | B,R0 | |
| 00B9 | A4 | 184 | | MUL | AB | |
| 00BA | FE | 185 | | MOV | R6,A | |
| 00BB | AFF0 | 186 | | MOV | R7,B | |
| 00BD | E9 | 187 | | MOV | A,R1 | ;COS 120 |
| 00BE | 89F0 | 188 | | MOV | B,R1 | |
| 00C0 | A4 | 189 | | MUL | AB | |
| 00C1 | C3 | 190 | | CLR | C | |
| 00C2 | 3E | 191 | | ADDC | A,R6 | |
| 00C3 | F8 | 192 | | MOV | R0,A | ;LOW BYTE, 120 |
| 00C4 | C5F0 | 193 | | XCH | A,B | |
| 00C6 | 3F | 194 | | ADDC | A,R7 | |
| 00C7 | F9 | 195 | | MOV | R1,A | ;HIGH BYTE, 120 |
| | | 196 | ; | | | |
| | | 197 | ; | | | |
| 00C8 | EA | 198 | | MOV | A,R2 | ;SIN 240 |
| 00C9 | 8AF0 | 199 | | MOV | B,R2 | |
| 00CB | A4 | 200 | | MUL | AB | |
| 00CC | FC | 201 | | MOV | R4,A | |
| 00CD | ADF0 | 202 | | MOV | R5,B | |
| 00CF | EB | 203 | | MOV | A,R3 | ;COS 240 |
| 00D0 | 8BF0 | 204 | | MOV | B,R3 | |
| 00D2 | A4 | 205 | | MUL | AB | |
| 00D3 | C3 | 206 | | CLR | C | |
| 00D4 | 3C | 207 | | ADDC | A,R4 | |
| 00D5 | FA | 208 | | MOV | R2,A | ;LOW BYTE, 240 |
| 00D6 | C5F0 | 209 | | XCH | A,B | |
| 00D8 | 3D | 210 | | ADDC | A,R5 | |
| 00D9 | FB | 211 | | MOV | R3,A | ;HIGH BYTE, 240 |
| | | 212 | ; | | | |
| | | 213 | ; | | THRESHOLD ROUTINE | |
| | | 214 | ; | | | |
| 00DA | D233 | 215 | THRESH: | SETB | FL1 | ;PRESET STATUS OF R1 |

MCS-51 MACRO ASSEMBLER    ILMD

| LOC | OBJ | LINE | SOURCE | | | |
|---|---|---|---|---|---|---|
| 00DC | EB | 216 | | MOV | A,R3 | |
| 00DD | 703D | 217 | | JNZ | LTF | ;FLUORESCENT CERTIAN |
| 00DF | E9 | 218 | | MOV | A,R1 | |
| 00E0 | 703A | 219 | | JNZ | LTF | |
| 00E2 | E8 | 220 | DAYLT: | MOV | A,R0 | |
| 00E3 | C3 | 221 | | CLR | C | |
| 00E4 | 3A | 222 | | ADDC | A,R2 | |
| 00E5 | 4004 | 223 | | JC | BRCH2 | |
| 00E7 | 9410 | 224 | | SUBB | A,#10H | ;CHECK OVERALL MAGNITUDES |
| 00E9 | 402C | 225 | | JC | LTD | |
| 00EB | EA | 226 | BRCH2: | MOV | A,R2 | |
| 00EC | C3 | 227 | | CLR | C | |
| 00ED | 9430 | 228 | | SUBB | A,#030H | ;CHECK FOR FLUORESCENT |
| 00EF | 4002 | 229 | | JC | TCK | ;GO ON TO TUNGSTEN CHECK |
| 00F1 | 211C | 230 | | AJMP | LTF | |
| 00F3 | 303300 | 231 | TCK: | JNB | FL1,RATIO | |
| 00F6 | C3 | 232 | ROT: | CLR | C | |
| 00F7 | 13 | 233 | | RRC | A | |
| 00F8 | F9 | 234 | | MOV | R1,A | |
| 00F9 | E8 | 235 | | MOV | A,R0 | |

```
00FA 03          236          RR     A
00FB F8          237          MOV    R0,A
00FC FB          238          MOV    R3,A
00FD C3          239          CLR    C
00FE 13          240          RRC    A
00FF FB          241          MOV    R3,A
0100 E9          242          MOV    A,R1
0101 70F0        243          JNZ    TCK
0103 E8          244  RATIO:  MOV    A,R0
0104 0A          245          INC    R2
0105 DA01        246          DJNZ   R2,NZR
0107 0A          247          INC    R2
0108 8AF0        248  NZR:    MOV    B,R2
010A 84          249          DIV    AB
010B C3          250          CLR    C
010C 9403        251          SUBB   A,#03
010E 5002        252          JNC    LTT
0110 0125        253          AJMP   STA          ;INDETERMINATE RE-READ SCENE
0112 7580FE      254  LTT:    MOV    P3,#0FEH     ;TUNGSTEN
0115 211F        255          AJMP   AGN
0117 7580FD      256  LTD:    MOV    P3,#0FDH     ;DAYLIGHT
011A 211F        257          AJMP   AGN
011C 7580FB      258  LTF:    MOV    P3,#0FBH     ;FLUORESCENT
011F 0125        259  AGN:    AJMP   STA
                 260          ;
                 261          ;
                 262          ;
0121 C28C        263  TIME:   CLR    TR0          ;TIMER DISABLED -- 11MHZ XTAL
0123 C28D        264          CLR    TF0          ;COMPLETION FLAG PRE-CLEAR
                 265                              ;LOAD TIMER FOR 1/(8*120)SAMPLES/SEC
0125 758CFC      266          MOV    TH0,#0FCH    ;COMPLEMENT OF 3
0128 758A4C      267          MOV    TL0,#04CH    ;COMPLEMENT OF (88-8)=83 (3BBH=955D)
012B D28C        268          SETB   TR0          ;START TIMER
012D 22          269          RET
                 270          ;
```

MCS-51 MACRO ASSEMBLER    ILMD

LOC  OBJ              LINE    SOURCE

271     ;
                      272             END

MCS-51 MACRO ASSEMBLER    ILMD

SYMBOL TABLE LISTING
------ ----- -------

```
N A M E      T Y P E    V A L U E    A T T R I B U T E S

A1 . . . .   C ADDR     00A5H    A
A2 . . . .   C ADDR     00B5H    A
A3 . . . .   C ADDR     0086H    A
A4 . . . .   C ADDR     009DH    A
AGN. . . .   C ADDR     011FH    A
B. . . . .   D ADDR     00F0H    A
BERR . . .   C ADDR     00A9H    A
BRCH2. . .   C ADDR     00EBH    A
DATN . . .   C ADDR     004BH    A
DAYLT. . .   C ADDR     00E2H    A
EA . . . .   B ADDR     01A8H.7  A
FL1. . . .   B ADDR     0026H.3  A
IE . . . .   D ADDR     00A8H    A
INIT . . .   C ADDR     0000H    A
LP1. . . .   C ADDR     0045H    A
LTD. . . .   C ADDR     0117H    A
LTF. . . .   C ADDR     011CH    A
LTT. . . .   C ADDR     0112H    A
MAIN . . .   C ADDR     002AH    A
NZR. . . .   C ADDR     0108H    A
P0 . . . .   D ADDR     0080H    A
P1 . . . .   D ADDR     0090H    A
P2 . . . .   D ADDR     00A0H    A
P3 . . . .   D ADDR     00B0H    A
PTA. . . .   C ADDR     005CH    A
PTB. . . .   C ADDR     0063H    A
PTC. . . .   C ADDR     006EH    A
PTD. . . .   C ADDR     0078H    A
PTE. . . .   C ADDR     008AH    A
PTF. . . .   C ADDR     0093H    A
PTG. . . .   C ADDR     00ABH    A
RATIO. . .   C ADDR     0103H    A
```

```
ROT. . . .   C ADDR   00F6H   A
RS0. . . .   B ADDR   000DH.3 A
RS1. . . .   B ADDR   000DH.4 A
SCOM . . .   D ADDR   0098H   A
SQR. . . .   C ADDR   00B6H   A
STA. . . .   C ADDR   0025H   A
STRT . . .   C ADDR   002DH   A
TCK. . . .   C ADDR   00F3H   A
TF0. . . .   B ADDR   0088H.5 A
TH0. . . .   D ADDR   008CH   A
THRESH . .   C ADDR   000AH   A
TIME . . .   C ADDR   0121H   A
TL0. . . .   D ADDR   008AH   A
TMOD . . .   D ADDR   0089H   A
TR0. . . .   B ADDR   0088H.4 A
```

REGISTER BANK(S) USED: 0

ASSEMBLY COMPLETE, NO ERRORS FOUND

I claim:

1. An illuminant discriminator comprising:
   an analog means for converting an impinging illuminant into an analog signal;
   a digital means coupled to said analog means for converting said analog signal into a digital signal; and
   computing means coupled to said digital means for performing a Fourier series analysis on said digital signal to determine the amplitude values of at least one harmonic of said analog signal, said computing means also performing a comparison of the determined amplitude values against the amplitude values of known illuminant sources to identify the type of impinging illuminant.

2. The illuminant discriminator according to claim 1 wherein said analog means is comprised of:
   light sensing means for transforming an impinging illuminant signal into an electrical signal;
   transimpedance amplifier means connected in circuit to said light sensing means for providing an amplified electrical signal;
   log amplifier means having an input connected in circuit to said transimpedance amplifier means for compressing the range of the amplified electrical signal from said transimpedance amplifier; and
   level shifting gain means having an input connected to said log amplifier means for receiving the compressed range amplified electrical signal and for shifting the level of the received signal to provide said analog signal.

3. Illuminant discrimination apparatus for detecting which of three types of impinging light, tungsten light, fluorescent light or daylight is predominant comprising:
   light-sensitive means responsive to incident light for producing an analog signal;
   circuit means connected to said light-sensitive means for conditioning said analog signal for analog-to-digital conversion;
   analog-to-digital converter means coupled to said circuit means for converting said analog signal into a digital signal; and
   processor means connected to said analog-to-digital converter for determining the amplitude values of at least one of the harmonics of said analog signal from said digital signal and for comparing the determined amplitude values against the amplitude values corresponding to tungsten light, fluorescent light and daylight to identify the predominant impinging light.

4. The illuminant discrimination apparatus according to claim 3 wherein said processor means includes, means for determining the fundamental frequently and at last one harmonic of the impinging light source from evenly spaced samples of said digital signal.

5. The illuminant discrimination apparatus according to claim 4 wherein said processor means further includes, means for determining the amplitudes of the fundamental frequency and at least one harmonic of the impinging light source from evenly spaced samples of said digital signal according to the following:

fundamental frequency amplitude $=(s3-s7)2+(s1-s5)2$ first harmonic amplitude $=(2-s4+s6-s8)2+(s1-s3+s5-s7)2$ where sn refers to the sample number.

6. A method for discriminating between an impinging tungsten light, fluorescent light or daylight comprising the steps of:
   (a) producing an analog signal as a function of an impinging light;
   (b) converting said analog signal into a digital signal;
   (c) determining from said digital signal the amplitude values of at least one harmonic of said analog signal; and
   (d) comparing the amplitude values determined in step (c) against the amplitude values of known tungsten light, fluorescent light and daylight to determine a match.

7. A method for discriminating between an impinging tungsten light, fluorescent light or daylight comprising the steps of:
   (a) producing an analog signal as a function of an impinging light;
   (b) converting said analog signal into a digital signal;
   (c) determining from said digital signal the fundamental frequency of said analog signal;
   (d) determining at least the first harmonic of said analog signal;
   (e) determining the amplitudes of the fundamental frequency and the first harmonics of said analog signal; and
   (f) comparing the amplitude values determined in step (e) against the amplitude values of known tungsten light, fluorescent light and daylight to determine a match.

* * * * *